3,311,521
IMAGE TRANSFER METHOD
Harry James Hofrichter, Eugene, Oreg., assignor to
Peter Hodgson
No Drawing. Filed Oct. 4, 1965, Ser. No. 492,851
5 Claims. (Cl. 156—234)

This invention relates to a novel method for the transfer of an ink image from an inked surface to a substrate. More particularly, the invention concerns the transfer of an ink image to a treated substrate employing a transfer medium comprising a silicone putty, as well as the treated substrate itself.

The use of a putty as a transfer medium for transferring an ink image to a substrate such as paper is known, and the process of treating the substrate in specific applications with various chemicals and solvents in an effort to control its ink retention properties is also known. Many of these chemicals and solvents are either too volatile to be practical or too toxic for uncontrolled use. Moreover, experience has shown that it is difficult to form transferred images on the substrate which are permanent when completely dry.

In accordance with the present invention there is provided a novel method for the transfer of an inked image or printed legend or design from an inked surface such as newsprint, carbon paper, pencil lead (graphite) drawing, and the like to a desired substrate. There is further provided a novel method for preparing the surface of the substrate to receive the transferred ink image, so as to result in a novel treated substrate.

The novel method of the invention comprises the steps of first preparing the substrate surface to receive the ink image by treating the substrate with an alkanediol. The alkanediol contains four carbon atoms and is a butylene glycol which has a hydroxyl in the 3-position, examples of which are 1,3-butylene glycol and 2,3-butylene glycol. The preferred agent is 1,3-butylene glycol (1,3-butanediol), a colorless, nontoxic liquid having a boiling point of 207.5° C. and a specific gravity of 1.0059 (20°/20° C.) which is completely miscible with water and alcohol. A second choice, 2,3-butylene glycol (2,3-butanediol) is also a colorless liquid with melting point 19° C., boiling point 180–184° C., specific gravity 1.0093, and due to its higher melting point may be advantageously used where the agent is to be applied as a solid.

Substrates which may be employed to receive and retain ink images, in accordance with the invention, include paper, human skin, cloth, painted and untreated wood, painted and enameled surfaces, leather, cardboard, ceramics, plastics, such as phenolic resins, polystyrene, polyethylene and similar materials in tube or sheet form, cellophane, rubber, and surfaces of metals such as aluminum and stainless steel.

The butylene glycol may be applied to the substrate in a number of ways, depending upon the characteristics of the glycol as well as those of the substrate itself. The form and manner in which the butylene glycol is applied will determine the character and properties of the resultant ink image. Thus the butylene glycol may be applied as a liquid or a gel, or as a solid. Where the butylene glycol is applied to a porous substrate, such as unsized or uncoated paper, cardboard or cloth, the glycol effects a permanent image on the substrate. The glycol is able to permeate and wet the substrate, application of an ink-bearing putty face followed by evaporation of the glycol effects the permanent image. If the substrate surface is notably nonporous or smooth, such as leather, human skin, plastic, glass or ceramic, the glycol transfer agent is retained on the surface, and while coating the surface, cannot permeate it. The resultant ink image is thus left on the surface and can be abraded or washed off.

The butylene glycol may be applied to the substrate by a variety of methods and devices, so long as a smooth and even distribution of the liquid is produced. Thus for application as a liquid there may be employed brushing, dipping, painting, rolling, padding and the like, as well as application in aerosol form or from an absorbent fiber. Thus, liquid and gel forms may be employed for cellulose acetate fiber material. For application as a gel, there may be employed a collapsible tube containing the glycol and fitted with a brush or roller spreader or the gel may be applied with a finger, tissue, absorbent sponge or cotton fiber pad, textile, woven or unwoven fabric. In solid form the glycol may be combined with a suitable binder to form a stick which will rub off or melt on applying pressure to form a thin film on the substrate. Advantageously, a butylene glycol is applied to the surface of a paper substrate to form a thixotropic gel or film coating the paper fibers with from about 5% to 25% by weight of the fibers coated.

Filler and pigments, particularly white pigments, when incorporated in the butylene glycol have been found to intensify images and ink receptivity. Titanium dioxide is particularly beneficial. The pigment may be dispersed in the butylene glycol, in liquid, gel or solid form. Other pigments and extenders may also be incorporated, including clay and finely divided silica (Cab-O-Sil, Cabot Corp., Boston, Mass.). These fillers are useful for obtaining clearer images on surfaces other than paper without the danger of smearing. For example, if the ink transfer agent put on human skin is greasy or like Vaseline, applying the ink-bearing putty may cause a smear. But addition of filler or pigment to the active agent produces enough friction so that the putty does not slip or smear, but instead gives a clear, undistorted image.

After the application of the butylene glycol to the substrate, the next step in the method of the invention comprises lifting an image from an inked surface such as newsprint, carbon paper, or ordinary pencil lead (graphite) drawings with a putty, maintaining or reforming the putty image as desired, and placing the inked putty surface face down on the prepared substrate which then dissolves or softens and absorbs some or all of the ink from the putty to form an image on the surface of the substrate.

While the invention requires a putty which will remove ink from an image-bearing paper, as described, and which will release a portion of the ink to a substrate by employing the butylene glycol to dissolve or soften and then remove the image from the putty and cause it to adhere to the substrate, the silicone putties are preferred because of their ease of handling and their superior capability of releasing the image to the substrate in the presence of the butylene glycol. The term silicone putty as employed herein refers to a well known type of silicone resin or rubber comprising solid polymers of organosiloxane of the type described, for example, in U.S. Patent 2,541,851. The properties of silicone putties are generally considered as derived from a balance between hydrophylic and hydrophobic groups, the material exhibiting both elastic and plastic properties ascribable to a two-phase system consisting of a highly cross-linked silicone network with hydrophobic methyl groups attached to the silicon. The mechanism by which the ink is picked up and/or released by the silicone putty is believed to be attributable to the action of the hydrophobic methyl silicones which act as solvents for the ink and remove free ink from an uncoated surface.

After contacting the inked surface with the silicone putty to remove the ink image from the surface to that of the putty and lifting the putty from the inked surface, the method of the invention includes the step of placing the portion of the putty carrying the ink image in contact with the treated substrate previously described for a time sufficient to transfer the image from the surface of the putty to the surface of the treated substrate.

The characteristics of the image removed from the putty onto the substrate are dependent both on the method of application of the active agent and on the nature of the substrate. The properties of certain gels produce images that are removable by washing from any glazed or nonporous surface, but which are permanent on porous surfaces. These properties are especially new and usable in a toy which would allow for removal images on skin, walls, or woodwork, but which would be permanent on a treated paper, or cloth. These properties allow a child to produce an imitation "tattoo" which is removable by washing, a decal-like print on a shirt or other article of clothing which is permanent, and the formulation of his own characters and faces by removing parts and placing them into a composite face or figure to produce interesting play opportunity. Decoration and pattern design of clothes is also feasible.

The process could also be used to "personalize" items such as clothes and letters with a monogram or an image of a child's name, or to reprint color pictures from newspapers into scrapbooks.

The application of these ideas for a toy is also supported by the safe and nontoxic nature of the butylene glycol, especially the 1,3-butylene glycol, by the freedom obtained by the various application media, and the variety of surfaces which are printable. In addition, the ease of handling and deformability of the silicone putties present an interesting and diversified approach to reproduction of images. The mechanisms developed also provide for the feasibility of non-smear, foolproof images which can be produced with a minimum of effort.

The preferred substrate, in accordance with the invention, is paper. The amount of butylene glycol applied to the paper substrate will generally range from about 15% to about 25% by weight, preferably 20% but is in no way limited to such range. The optimum amount will depend upon the porosity and absorbency of each particular paper. A preferred embodiment of a treated substrate is paper having incorporated in the fiber thereof about 20% by weight of 1,3-butylene glycol, which gives good images.

The butylene glycol may be applied to the paper directly as a liquid by brushing or dipping. When desirable, butylene glycol may also be applied in the form of gel. Pigments and fillers may also be incorporated.

The following examples illustrate the practice of the invention, but are not to be regarded as limiting.

*Example 1*

A substrate was prepared by dipping a sheet of bond paper in 1,3-butylene glycol until 20% by weight was absorbed. A mass of silicone putty capable of being held in the hand was pressed against the printed side of a sheet of paper bearing an ink image. The putty was lifted from the ink surface and the portion of the putty carrying the ink image was place in contact with the paper containing the butylene glycol under moderate pressure for a time sufficient to permit transfer of the image to the paper. A clear firm image was obtained.

*Example 2*

Proceeding as in Example 1, a gel was prepared from 2 oz. water, 2 oz. 1,3-butylene glycol and 0.1 oz. hydroxyethyl cellulose, the foregoing proportions being 50, 50, and 2.5 parts by weight of the ingredients, respectively. The water and the hydroxyethyl cellulose were stirred to suspend the latter, than heated to dissolve and form a gel. The glycol was then stirred in. The mixture formed a very stiff gel, which when spread out on a paper substrate gave good image reproduction with the silicone putty.

*Example 3*

The following is an example of another type of gel:

| | Parts by wt. |
|---|---|
| 1,3-butylene glycol | 60 |
| Water | 20 |
| Hydroxyethyl cellulose (HEC) (M.W. approx. 15,000) | 1 |
| | 81 |

2 oz. water and 0.1 oz. HEC were mixed and heated until a homogeneous gel was obtained. 6 oz. 1,3-butylene glycol was added and stirred until the glycol was thoroughly incorporated in the gel. This gave very good image transfer on paper (faithful reproduction) and human skin (like imitation tattoo).

*Example 4*

| | Parts by wt. |
|---|---|
| Same materials Example 3 | 100 |
| Cab-o-sil | 5 |

The components were mixed mechanically and applied to skin. The mixture gave very good non-smear images on skin which have the appearance of an imitation tattoo. Treated paper also gave good images.

*Example 5*

The following illustrates a pigmented mixture with butylene glycol:

| | Oz. |
|---|---|
| 1,3-butylene glycol | .50 |
| Water | .30 |
| Anatase titanium dioxide (AMO) | .06 |
| Product of Example 2 | .50 |
| | 1.36 |

The 1,3-butylene glycol was mixed with the AMO to give a white paste which was then combined with Example 2 and water and the mixture heated and stirred to produce a uniform gel with the consistency of a white paint. These gave very good images on paper and especially good on human skin.

*Example 6*

| | Oz. |
|---|---|
| 1,3-butylene glycol | 1 |
| Water | 1 |
| 2020P propylene glycol, M.W. approx. 2000 | 0.3 |
| Hydroxyethyl cellulose (HEC) | 0.1 |

The butylene glycol, polypropylene glycol and water were mixed and combined with the HEC with heat and stirring to give a very stiff, cloudy gel which gave good picture reproduction on treated paper.

*Example 7*

| | Oz. |
|---|---|
| 1,3-butylene glycol | ¼ |
| Carbowax 4000 (Union Carbide Corp.) | ¼ |

These components were melted together by warming to temperature slightly above the Carbowax melting point, then cooled in ice bath to approx. 20° C. The resulting material was a soft solid at that temperature and at 30° C. was a soft, pasty mass which could be conveniently spread out on paper, skin, or other surfaces. Image transfer was good on both paper and skin.

*Example 8*

| | Parts |
|---|---|
| Paste material from Example 7 | 10 |
| Titanium dioxide (anatase) | 1 |

The components were mixed mechanically to give a white, waxy paste that could be spread out smoothly with finger or tissue or other convenient applicator, and which gave very good images on paper and skin.

*Example 9*

The following are examples of aerosol formulations which may be used to apply the butylene glycol to a substrate:

|  | A | B |
|---|---|---|
|  | Percent | Percent |
| 1,3-butylene glycol | 4 | 4 |
| Freon 11 | 30 | 40.5 |
| Freon 12 | 50 | 40.5 |
| Ethyl alcohol | 16 | 15 |

Such formulations are convenient and easy to apply, and produce good images.

*Example 10*

The following is an example of a pigmented liquid for application to a substrate:

|  | Percent |
|---|---|
| 1,3-butylene glycol | 45 |
| 400 M.W. polyethylene glycol (PEG) | 30 |
| Anatase titanium dioxide (AMO) | 25 |

The 1,3-butylene glycol and PEG were mixed and the AMO was added and stirred to give a suspension which, when spread on paper gave excellent transfer to the paper substrate, and which had the appearance of a white paint.

What is claimed is:

1. Method for transferring a printing type ink image from an inked surface to a substrate comprising the steps of:
    (a) preparing the surface of said substrate to receive said image by applying to said substrate a four carbon straight chain butylene glycol selected from the group consisting of 1,3-butylene glycol and 2,3-butylene glycol;
    (b) contacting said inked surface with a silicone putty to transfer said ink image to the surface of the silicone putty;
    (c) separating the silicone putty from said inked surface; and
    (d) contacting the portion of the silicone putty carrying said ink image with said prepared substrate for a time sufficient to transfer said ink image from the surface of the putty to the surface of the prepared substrate.

2. The method of claim 1 in which the substrate is paper.

3. The method of claim 1 in which the butylene glycol is applied to the substrate as a liquid.

4. The method of claim 1 in which the butylene glycol is applied to the substrate in the form of a gel.

5. The method of claim 1 in which the butylene glycol includes a pigment.

References Cited by the Examiner

UNITED STATES PATENTS

| 748,179 | 12/1903 | Fowler et al. | 117—154 |
| 1,490,523 | 4/1924 | Thomson | 117—154 X |
| 2,032,645 | 3/1936 | Youtz | 117—154 X |
| 2,262,488 | 11/1941 | Bjorksten | 106—311 |
| 2,294,711 | 11/1942 | Bjorksten | 106—311 |
| 2,980,015 | 4/1961 | Zentner et al. | 101—426 X |
| 3,146,144 | 8/1964 | Lemelson | 156—241 X |

EARL M. BERGERT, *Primary Examiner.*

HAROLD ANSHER, *Examiner.*